United States Patent
Samour et al.

[15] 3,671,502
[45] June 20, 1972

[54] BETAINE COPOLYMERS WITH HYDROXYALKYLACRYLATES AND HYDROXYALKYLMETHACRYLATES

[72] Inventors: Carlos M. Samour, Wellesley; Martin L. Falxa, Cambridge, both of Mass.

[73] Assignee: The Kendall Company, Wolpole, Mass.

[22] Filed: Nov. 12, 1970

[21] Appl. No.: 89,108

[52] U.S. Cl..............260/79.3 MU, 117/122 P, 117/122 PF, 260/80.3 N, 260/80.73, 260/86.1 N
[51] Int. Cl.......................................C08f 15/00, C08f 15/16
[58] Field of Search...................260/79.3 M, 89.7 N, 89.5 N, 260/89.5 R, 86.1 N

[56] References Cited

UNITED STATES PATENTS

| | | |
|---|---|---|
| 2,833,650 | 5/1958 | Shacklett..................................96/114 |
| 2,863,769 | 12/1958 | Moede.....................................96/114 |
| 3,483,155 | 12/1969 | Samour..................................260/29.6 |
| 3,509,111 | 4/1970 | Samour..............................260/78.5 R |

Primary Examiner—Joseph L. Schofer
Assistant Examiner—C. A. Henderson, Jr.
Attorney—Ellen P. Trevors and Robert D. Chodera

[57] ABSTRACT

Copolymers of carboxybetaines or sulfobetaines having the formula

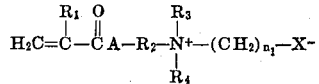

wherein $R_1$ is hydrogen or methyl; A is oxygen or —NH—; $R_2$ is ethylene, propylene, 2-hydroxypropylene or 2-acetoxypropylene; $R_3$ and $R_4$ are alkyl; $n_1$ is 1 to 4 and $X^-$ is $SO_3^-$ or $CO_2^-$; and about 10 to about 95.0 per cent by weight of hydroxyethylacrylate, hydroxyethylmethacrylate, hydroxypropylacrylate, hydroxypropylmethacrylate, polyethylene glycol acrylate, polyethylene glycol methacrylate, polypropylene glycol acrylate, polypropylene glycol methacrylate, polyglycerolacrylate or polyglycerolmethacrylate are disclosed. These neutral, hydrophilic copolymers are useful as binders.

6 Claims, No Drawings

BETAINE COPOLYMERS WITH HYDROXYALKYLACRYLATES AND HYDROXYALKYLMETHACRYLATES

This invention relates to selected copolymers comprising units derived from carboxybetaines or sulfobetaines and units derived from hydroxyalkyl acrylates/methacrylates, polyalkylene glycol acrylates/methacrylates or polyglycerol acrylates/methacrylates.

More particularly, this invention relates to neutral, hydrophilic copolymers of monomers consisting essentially of about 5.0 to about 90 percent by weight of a carboxybetaine or sulfobetaine having the formula

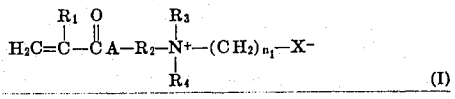

(I)

wherein $R_1$ is hydrogen or methyl; A is oxygen or —NH—; $R_2$ is ethylene, propylene, 2-hydroxypropylene or 2-acetoxypropiene; $R_3$ and $R_4$ are alkyl; $n_1$ is 1 to 4 and $X^-$ is $SO_3^-$ or $CO_2^-$; and about 10 to about 95.0 per cent by weight of hydroxyethylacrylate, hydroxyethylmethacrylate, hydroxypropylacrylate, hydroxypropylmethacrylate, or a polyalkylene glycol acrylate/methacrylate or polyglycerol acrylate/methacrylate having the formula

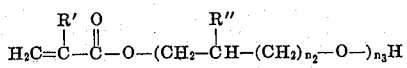

wherein R' is hydrogen or methyl, R'' is hydrogen, methyl or hydroxyl, $n_2$ is zero where R'' is hydrogen or methyl and 1 where R'' is hydroxyl, and $n_3$ is 2 to 4.

Various carboxybetaines, sulfobetaines, homopolymers and copolymers thereof have been reported in the literature. Thus, U.S. Pat. Nos. 3,473,998 and 3,478,001 disclose sulfobetaines having the formula I and copolymers thereof with acrylonitrile, while U.S. Pat. No. 3,497,482 describes homopolymers of these sulfobetaines and copolymers with certain ethylenically unsaturated monomers. The carboxybetaines having the formula I, homopolymers thereof and copolymers with various ethylenically unsaturated compounds are reported in U.S. Pat. Nos. 2,777,872; 2,935,493 and 2,958,682.

Now it has been found that copolymers of carboxybetaines and sulfobetaines with hydroxyalkylacrylates and hydroxyalkylmethacrylates can be provided according to this invention. These copolymers are particularly valuable as hydrophilic bonding agents for glass, leather, plastics, steel, hides and wood.

The carboxybetaine and sulfobetaine monomers I can be conveniently prepared by reacting the appropriate N-dialkylaminoalkylacrylate/methacrylate or N-dialkylaminoalkylacrylamide/methacrylamide with a halomonocarboxylic (or sulfonic) acid salt or an alkyl lactone or sultone following the procedure described in U.S. Pat. No. 2,744,130.

Preparation of the copolymers of this invention is effected by polymerizing the carboxybetaine or sulfobetaine I or mixtures thereof, with hydroxyethylacrylate/methacrylate, hydroxypropylacrylate/methacrylate, polyethylene glycol acrylate/methacrylate, polypropylene glycol acrylate/methacrylate, polyglycerol acrylate/methacrylate, or mixtures thereof, the proportion of monomers being within the aforementioned range. The polymerization can be initiated by ultraviolet irradiation, heat, redox systems, peroxides, 2,2'-azobis-isobutyronitrile or other suitable means. Preferably, the polymerization is carried out in aqueous or organic solvent solutions at a temperature of from about room temperature to 100°C.

Although any of the copolymers can be conveniently prepared, preferred copolymers are those of carboxybetaine or sulfobetaine I wherein $R_3$ and $R_4$ are alkyl having one to four carbon atoms with hydroxyethylacrylate/methacrylate or hydroxypropylacrylate/methacrylate.

While not essential to the preparation of the copolymers of this invention, minor amounts, for example up to 10.0 percent by weight of the total monomer charge, of an appropriate crosslinking agent can be utilized. Thus, ethylene glycol dimethacrylate, polyethylene oxide dimethacrylate, N-methylol acrylamide, glycidyl methacrylate, etc. can be suitably employed as crosslinking agents.

The copolymers of this invention are useful as hydrophilic binders for a variety of materials, having advantages for these applications over their respective homopolymers and over various copolymers of betaines with other ethylenically unsaturated monomers. Thus, for example, the adhesion of these copolymers to various substrates is better than that of the corresponding polysulfobetaine and polycarboxybetaine homopolymers. These copolymers have increased breaking strength over homopolymers of hydroxyalkylacrylates, thus rendering them highly attractive for use as binders in applications where strength is important, such as in the production of certain non-wovens.

The following examples will serve to illustrate the preparation of various copolymers in accordance with the practice of this invention.

EXAMPLE

A. Preparation of Sulfobetaine

N-dimethylaminoethylmethacrylate (235.5 g.) was added slowly, with stirring, at 15° C to a mixture of γ-propane sultone (183 g.) in ethyl acetate (500 ml.). An exothermic reaction occurred. After completion of the addition, an additional 100 ml. of ethyl acetate was added and the reaction mixture stirred for 4 hours at room temperature. The crude product was separated from the reaction mixture by filtration, washed with ethyl acetate and dried under vacuum at room temperature to provide 150.6 g. of solid material. This solid product was dissolved in 150 ml. of hot methanol with stirring at room temperature. Then, ethyl acetate (400 ml.) was added slowly, with stirring, to the clear solution. The solution was refrigerated overnight and crystals separated by filtration. A second crop of crystals was obtained from the mother liquor by treatment with ethyl acetate followed by cooling. A total yield of 140.0 g. of N-methacryloyloxyethyl-N,N-dimethyl-N,3-propyl-sulfobetaine was obtained, m.p. 280°–300° C (dec).

B. Preparation of Copolymer

A mixture of 9 g. of the sulfobetaine prepared in Part A, 1 g. of hydroxyethylmethacrylate and 0.02 ml. of ethylene glycol dimethylmethacrylate in 10 ml. of $H_2O$ prepared and 0.054 g. potassium persulfate and 0.02 g. sodium bisulfite was added thereto. The resulting mixture was placed in a 13.5 cm × 4.2 cm × 0.4 cm cavity formed in a 15.7 cm × 4.5 cm × 1.3 cm polytetrafloroethylene piece. The cavity was covered with a vented polytetrafloroethylene cover. Nitrogen was passed over the mixture for about 2 hours; polymerization occurred overnight.

The breaking strength of the copolymer was determined according to the following lap shear test procedure for both polyethylene terephthalate and steel substrates. After equilibration for 4–8 weeks in a 90 percent humidity chamber, approximately 0.25 g. copolymer samples were placed on one end of duplicate 10 cm by 1.0 cm substrate strips. The polyethylene terephthalate strips had a thickness of 4 mils; the steel strips, 2 mils thick. Each sample was pressed between release paper in a vise using calibrated metal spacers to a thickness of about 61.5 mils. After 15 minutes, the substrate strips were removed from the vise and the samples trimmed to a 1 cm by 1 cm area on the substrate. The samples were aligned with each other on opposite sides of a third strip comprised of the same material and having the same dimensions as the sample strips, and with the latter strips extending downwardly. Release paper was placed over the lapped assembly and the system placed in the vise and pressed to a thickness of 51.5 mils for 15 minutes. During all the pressing and trimming operations, the samples were held above a water bath to maintain the 90 percent humidity environment. Then the assembly was clamped in an Instron tester. Employing an Instron cross-head speed of 0.2 inch/min., the test was stopped when the shear stress peaked. A breaking strength of 35.5 ± 2.0 g./cm² for polyethylene terephthalate substrate and 109.0 ± 3.0 g./cm² for steel were recorded.

EXAMPLE 2

Following the procedure of Example 1, Part B, a mixture of 0.5 g. of the sulfobetaine prepared in Example 1, Part A and 9.5 g. of hydroxyethylmethacrylate in 10 ml. of water was polymerized employing 0.054 g. potassium persulfate and 0.02 g. sodium bisulfite as the initiator.

The breaking strength of the polymer was determined on an Instron Tester employing a crosshead speed of 5 inches/min., a gauge length of 1 inch, and a sample 3 inches long, 0.210 inches wide and 0.122 inches thick. The breaking strength of the sample was 140 lb./sq. in.

EXAMPLE 3

A. Preparation of Carboxybetaine

A mixture of β-propiolactone (7.2 g.) in methyl ethyl ketone (10 g.) was added slowly, with stirring, to a mixture of N-dimethylaminoethylmethacrylate (15.7 g.) and methyl ethyl ketone (10 g.). The reaction mixture was maintained at −10° to 30° C by means of a dry ice/acetone bath. After maintaining the mixture at 0° C overnight, filtration provided 16 g. of N-methacryloyloxyethyl-N,N-dimethyl-N,2-ethyl carboxybetaine, m.p. 102°–105° C.

B. Preparation of Copolymer

Following the procedure described in Example 1, Part B, a mixture of 9.5 g. of hydroxyethylmethacrylate and 0.5 g. of the carboxybetaine prepared in Part A in 10 ml. of water was polymerized employing 0.054 g. of potassium persulfate as the initiator. The polymerization was carried out overnight at 60° C.

EXAMPLE 4

The amount of 1.0 g. of the sulfobetaine prepared in Example 1 was charged to a 20 ml. vial in an ice bath. The sulfobetaine was dissolved in 5 ml. of water with stirring. To the solution was added sequentially, with stirring, 1 ml. of ethanol, 9.0 g. of hydroxpropylmethacrylate and 1.0 ml. of 3 percent hydrogen peroxide solution. While continually stirring the solution, 0.5 ml. of an ascorbic acid/ferrous catalyst, prepared by dissolving 0.02 g. ferrous ammonium sulphate and 0.4 g. ascorbic acid in 10 ml. water, was added dropwise. After 20 minutes, polymerization had occurred as evidenced by the formation of a white, sticky mass when a drop of the reaction solution was added to distilled water. The polymer solution was poured into a polyethylene terephthlate tray, which was placed in a vented oven at 75° C for 2 hours in order to evaporate the solvents. The resulting polymeric films were colorless and transparent.

EXAMPLE 5

A copolymer was prepared employing the reactants and following the procedure of Example 4, with the exception that 2.0 g. of the sulfobetaine were polymerized with 8.0 g. of hydroxypropylmethacrylate.

EXAMPLE 6

A copolymer was prepared employing the reactants and following the procedure of Example 4, with the exception that 3.0 g. of the sulfobetaine were polymerized with 7.0 g. of hydroxypropylmethacrylate.

COMPARATIVE EXAMPLE 1

For purposes of comparison, a homopolymer was prepared by polymerizing 10 g. of the sulfobetaine described in Example 1, Part A, in the presence of 0.02 ml. ethylene glycol dimethlacrylate in 10 ml. of water. Initiation was effected by the addition of 0.054 g. potassium persulphate and 0.02 g. sodium bisulfite. The polymerization was carried out in the same manner as described in Example 1.

Lap shear tests were carried out following the procedure described in Example 1, Part B. A breaking strength of 32.6 ± 0.4 g./cm² for polyethylene terephthalate substrate and 85.0 ± 1.5 g./cm² for steel were determined. Since breaking strength is indicative of the polymer-substrate bond, it will be apparent that the copolymer of Example 1, prepared from 90 percent by weight sulfobetaine and 10 percent by weight hydroxyethylmethacrylate, is a superior adhesive to the sulfobetaine homopolymer, its breaking strength being about 10 percent and 25 percent greater with respect to polyethylene terephthalate and steel respectively, than that of the homopolymer.

COMPARATIVE EXAMPLE 2

For further purposes of comparison, a homopolymer of hydroxyethylmethacrylate was prepared from 10 g. of hydroxyethylmethacrylate in 10 ml. of H₂O using the same initiator system in the same amount and employing the polymerization technique described in Example 1. When a homopolymer sample 3 inches long, 0.180 inches wide and 0.101 inches thick was tested in accordance with the procedure described in Example 2, a breaking strength of 110 lb./sq. in. was recorded.

What is claimed is:

1. A neutral, hydrophilic copolymer of monomers consisting essentially of
   a. about 5.0 to about 90 percent by weight of a carboxybetaine or sulfobetaine having the formula

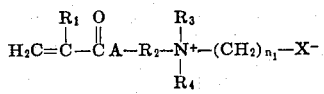

wherein R₁ is hydrogen or methyl; A is oxygen or —NH—; R₂ is ethylene, propylene, 2-hydroxypropylene or 2-acetoxypropylene; R₃ and R₄ are alkyl having one to four carbon atoms; $n_1$ is 1 to 4 and X⁻ is SO⁻₃ or CO⁻₂; and
   b. about 10 to about 95.0 percent by weight of hydroxyethylacrylate, hydroxyethylmethacrylate, hydroxypropylacrylate, hydroxypropylmethacrylate, or a polyalkylene glycol acrylate/methacrylate or polyglycerol acrylate/methacrylate having the formula

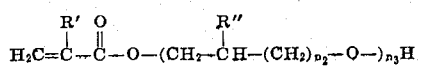

wherein R' is hydrogen or methyl, R" is hydrogen, methyl or hydroxyl, $n_2$ is zero where R" is hydrogen or methyl and 1 where R" is hydroxyl, and $n_3$ is 2 to 4.

2. The copolymer of monomers of claim 1 consisting essentially of said carboxybetaine or said sulfobetaine with hydroxyethylacrylate, hydroxyethylmethacrylate, hydroxypropylacrylate or hydroxypropylmethoacrylat.

3. The copolymer of monomers of claim 2 wherein said carboxybetaine or sulfobetaine is selected from those having the formula of claim 1 wherein R₂ is ethylene and R₃ and R₄ are methyl.

4. The copolymer of monomers of claim 3 consisting essentially of about 5.0 to about 90 percent by weight of N-methacryloyloxyethyl-N,N-dimethyl-N,3-propyl-sulfobetaine and about 10 to about 95.0 percent by weight hydroxyethyl methacrylate.

5. The copolymer of monomers of claim 3 consisting essentially of about 5.0 to about 90 percent by weight of N-methacryloyloxyethyl-N,N-dimethyl-N,2-ethyl-carboxybetaine and about 10 to about 95.0 percent by weight hydroxyethylmethacrylate.

6. The copolymer of monomers of claim 3 consisting essentially of about 5.0 to about 90 percent by weight of N-methacryloyloxyethyl-N,N-dimethyl-N,3-propyl-sulfobetaine and about 10 to about 95.0 percent by weight hydroxypropylmethacrylate.

* * * * *